Nov. 3, 1964    J. T. DRUMM ETAL    3,155,370
COUPLING MEMBERS FOR DISCONNECTIBLY JOINING CONDUITS
Filed Oct. 20, 1961    3 Sheets-Sheet 1

INVENTORS—
Joseph T. Drumm & William Meyer,
BY Richard M. Cifelli,
Attorneys—

INVENTORS;
Joseph T. Drumm & William Meyer,
BY Richards & Cifelli,
Attorneys

Nov. 3, 1964 J. T. DRUMM ETAL 3,155,370
COUPLING MEMBERS FOR DISCONNECTIBLY JOINING CONDUITS
Filed Oct. 20, 1961 3 Sheets-Sheet 3

INVENTORS—
Joseph T. Drumm & William Meyer,
BY Richard W. Bifelli,
Attorneys—

United States Patent Office 3,155,370
Patented Nov. 3, 1964

3,155,370
COUPLING MEMBERS FOR DISCONNECTIBLY
JOINING CONDUITS
Joseph T. Drumm, Short Hills, and William Meyer, East
Orange, N.J., assignors to Wheaton Brass Works,
Union, N.J., a corporation of New Jersey
Filed Oct. 20, 1961, Ser. No. 146,655
5 Claims. (Cl. 251—248)

This invention relates to cooperative coupling members for disconnectibly joining conduits or pipes for fluid flow therethrough.

This invention has for an object to provide novel constructions of cooperative separable coupling members, wherein one coupling member is relatively stationary and the other coupling member is rotatable relative thereto, whereby the rotative movement of the latter is utilized not only to join the same to the former, but also to transmit axial opening movement of a closing valve of the latter, which opening movement is transmitted to a closing valve of the former, whereby to simultaneously open the respective valves for fluid flow through the joined coupling members.

Another object of this invention is to provide the rotative coupling member with a novel valve operating mechanism which is mounted externally on the body thereof, so that internal obstruction or restriction of fluid flow through the connected coupling members is avoided and a greater flow area exists within their interiors, thus minimizing pressure loss.

A further object of this invention is to provide separable coupling members which can be operatively connected together by radial projections on the rotative coupling member which, upon rotation of this coupling member, engage beneath an annular coupling flange of the relatively stationary coupling member, and wherein the novel valve operating mechanism of the rotative coupling member comprises a sun or ring gear having means to interlock the same with the stationary coupling member upon operative connection of said coupling members, and planetary gear transmission adapted to be operated by said then stationary sun or ring gear to transmit operative movement to crank means adapted to engage in transverse slotway means in the valve of the rotative coupling member, whereby, upon rotation of the rotative coupling member relative to the stationary coupling member, to cause axial opening and closing movements of the valve of the former operative to engage and likewise effect axial opening and closing movements of the valve of the latter, and thus to open and close the connected coupling members to fluid flow therethrough.

Still another object of this invention is to provide a novel construction of stationary coupling member, wherein its valve means comprises a sealing poppet valve to close its outlet end, and a primary plunger valve to close its intake end, the latter, due to its unbalanced areas, having ability to close against line flow with little or no shock pressure; said primary plunger valve including a control pilot valve means adapted to be manually operated.

The above and other objects will be understood from a reading of the following description of an illustrative embodiment of this invention in connection with the accompanying drawings thereof, in which drawings:

FIG. 4 is a fragmentary vertical longitudinal sectional view, taken on line 4—4 in FIG. 1, but drawn on a somewhat enlarged scale.

Like characters of reference are employed in the above described views, to indicate corresponding parts.

Figure 1:
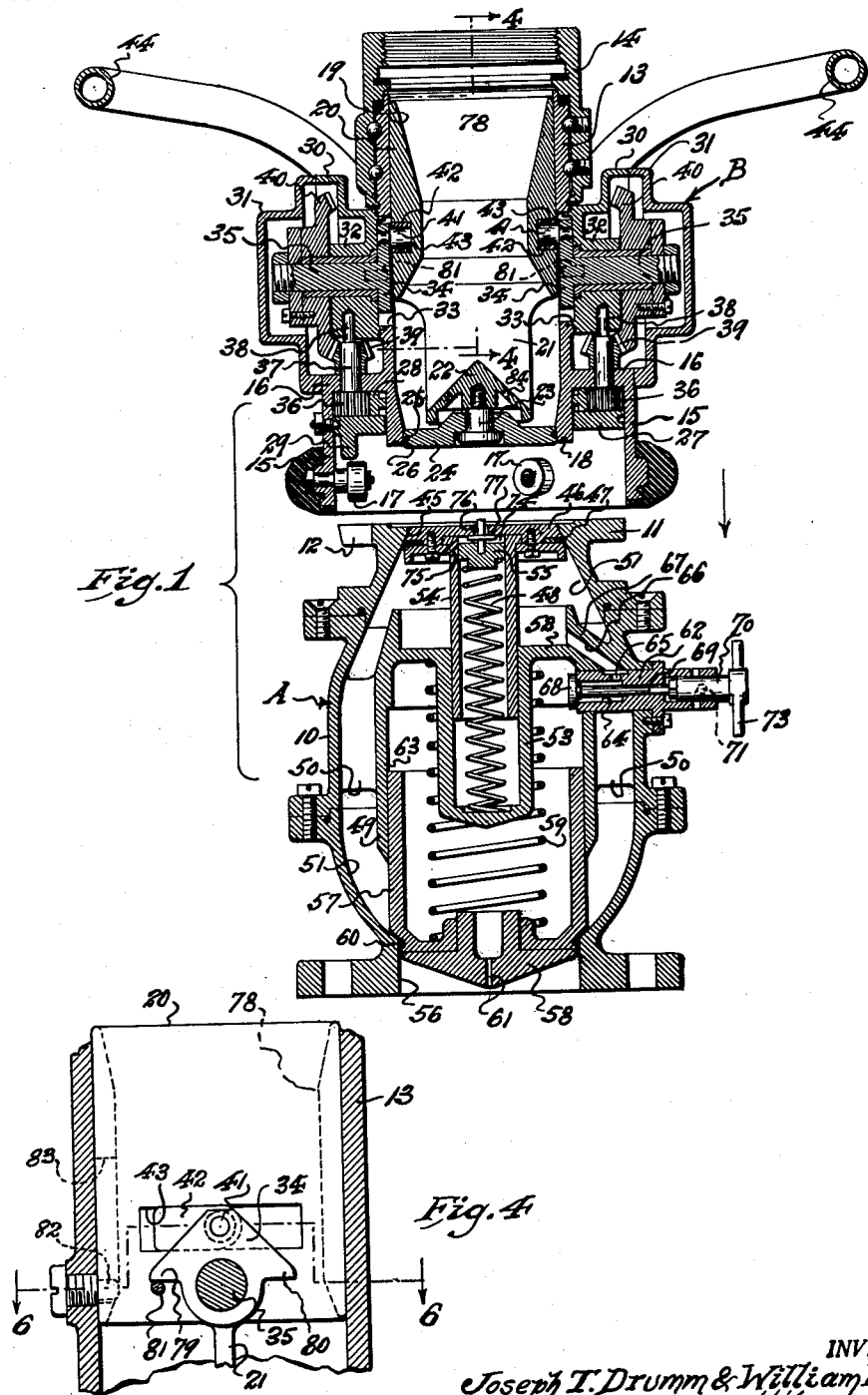
FIG. 1 is a longitudinal sectional view of the opposed coupling members in separated relation, but ready to be connected, the valves thereof being closed.

Referring to the drawings, the stationary coupling member for convenience hereinafter referred to as the hydrant, is generally designated by the reference character A; and the rotative coupling member, for convenience hereinafter sometimes referred to as the refueler valve, is generally indicated by the reference character B. It will be understood that these coupling members are well adapted for any use wherein delivery of a desired fluid from a source of supply to a place of use is required. More particularly, the coupling members are especially well adapted for delivery of a fuel fluid, e.g. gasoline, from a supply served through the hydrant A to the tanks of aircraft or the like in refueling operations.

The hydrant A comprises an endwise open hollow body or casing 10, which is provided at its outlet end with an external annular coupling flange 11 having a plurality of circumferentially spaced notches 12.

Figure 2:
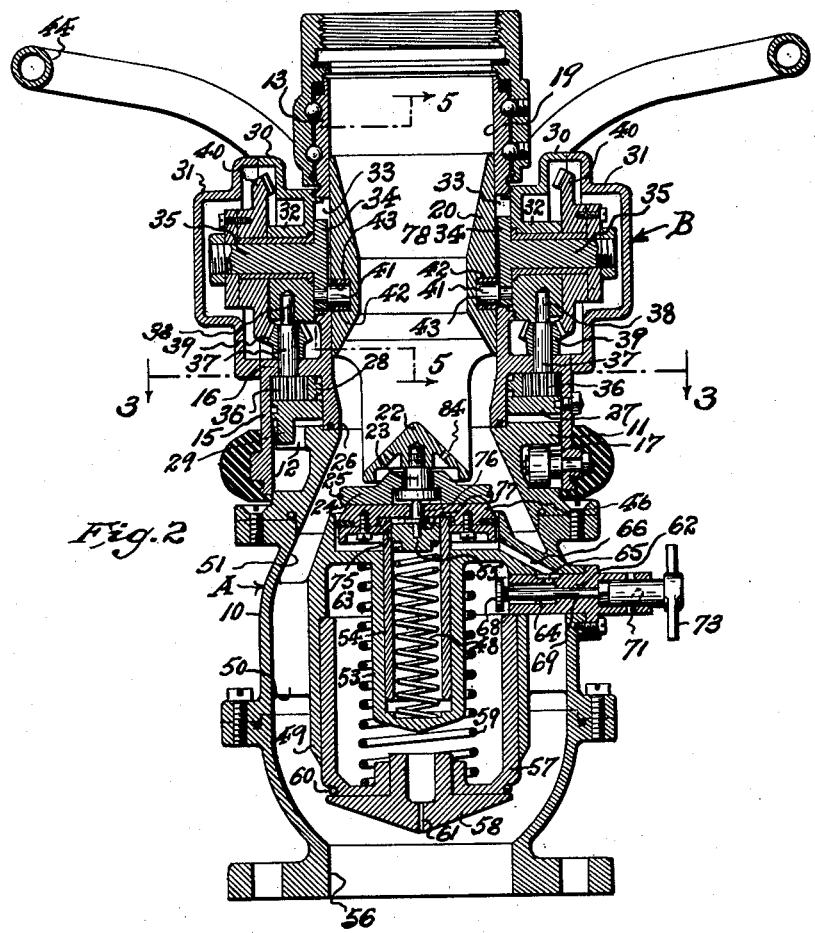
FIG. 2 is a similar longitudinal sectional view, showing the coupling members connected together in operative joined relation, and with the valves thereof open.

The rotatable coupling member B comprises a substantially cylindrical endwise open body or casing 13, upon the upper end of which is rotatably mounted, for swiveling connection therewith, a hose coupling or connecting member 14. The lower end portion of the body or casing 13 is provided with an outwardly offset annular skirt portion 15, which surrounds and projects, in downwardly open formation, below the lower end of said body or casing 13, being connected therewith by an offsetting top wall 16. This skirt portion 15 is of an internal diameter adapted to telescope and engage over the coupling flange 11 of the hydrant A, when the coupling member B is applied to said hydrant for coupled connection thereto. Internally mounted on the interior of the skirt portion 15 are circumferentially spaced radial projections, corresponding in spacing to the spacing of the notches 12 of the coupling flange 11 of the hydrant A (see FIG. 1). These projections are preferably in the form of rollers 17, which, when connecting the coupling member B to the hydrant A, can be passed downwardly through the notches 12 of the coupling flange 11 of the latter, and then, by rotation of the coupling member B, engaged beneath said coupling flange 11, thereby securing the coupling member B in operative joined and coupled relation to the hydrant A (see FIG. 2). When the coupling member B is thus coupled to the hydrant A, the lower end of its body or casing 13 abuts the upper end of the hydrant body or casing 10, and by means of an interposed seal ring 18 is sealed in connection therewith.

Axially slidable in the bore 19 of the body or casing 13 of the coupling member B is a valve plunger comprising an upper tubular section 20 from the lower end of which depends, as an integral part thereof, a transverse or diametric web 21 which terminates in a preferably conical head 22. Connected with the head 22, by a headed stud 23, is a valve disc 24, the periphery of which is provided with a seal ring 25, when the valve plunger is retracted to normal raised position within the body or casing 13, the valve disc 24 engages its seal ring 25 with an internal seat 26 with which the lower end of the body or casing 13 is provided, thus closing the coupling member B against fluid flow.

Supported within the interior of the skirt portion 15 of the body or casing 13 of the coupling member B, around the lower end portion of said body or casing, is an annular carrier member 27, to which is affixed a sun or ring gear 28 that is disposed beneath the top wall 16 of said skirt portion 15 adjacent said lower end portion of the body or casing 13. The carrier member 27 and its sun or ring gear 28 is so supported relative to the body or casing 13 and its skirt portion 15, that the latter parts can rotate relative to the former parts, when said former parts are held stationary. Means is provided for holding the carrier member 27 and its sun or ring gear 28 stationary or non-rotatable when the coupling member B is joined to the hydrant A in operative coupled relation. This means comprises a key lug 29, which depends from the carrier member 27, and which, when the coupling member B and hydrant A are joined in operative coupled relation, will engage in a notch 12 of the coupling flange 11 of the hydrant, thus interlocking the carrier member 27 and its sun or ring gear 28 with the stationary hydrant A, so that the coupling member B is rotatable relative to the thus stationary carrier member 27 and sun or ring gear 28.

Respectively affixed to diametrically opposite sides of the body or casing 13 and above the skirt portions 15, so as to be unitary therewith, are outwardly open housings 30, which are normally closed by detachable cover sections 31 suitably secured thereto. The housings 30 are each provided with bearing portions 32, the inner ends of which communicate with respective circular openings or chambers 33 that are provided in the adjacent side walls of the body or casing 13 between the housings and the bore 19 of said body or casing in which the upper section 20 of the valve plunger of the coupling member B moves. Rotatable in the respective openings or chambers 33 are crank discs 34, (hereinafter more particularly described) the outwardly extending shafts 35 of which are journaled in the respective housing bearing portions 32. These crank disc shafts are adapted to be driven by the sun or ring gear 28 through respective planetary gear transmissions. Each such transmission comprises a spur gear 36 which meshes with said sun or ring gear 28. The vertical shafts 37 of the spur gears 36 extend upwardly through the top wall 16 of the skirt portion 15, so as to be journaled therein, with their upper ends 38 journaled in the sides of the respective bearing portions 32 of the housings 30. Fixed on each shaft 37 is a drive bevel gear 39 which meshes with a driven bevel gear 40 that is secured to a crank disc shaft 35, whereby to drive the latter and its crank disc 34.

The crank discs 34 are each provided with a bushed crank pin 41 which pivotally engages a slide piece 42. The adjacent side walls of the upper section 20 of the valve plunger of coupling member B are each provided with external transverse channels or slotways 43 in which said respective slide pieces 42 are slidably engaged.

The coupling member B is provided with radially and oppositely projecting hand grip members 44 affixed to the body or casing 13 thereof, and by means of which rotative movement can be manually applied to the coupling member B for operatively coupling the same to the hydrant A.

Referring now to the stationary coupling member or hydrant A, the outlet end portion of its body or casing 10 is inwardly and upwardly tapered, and is internally formed to provide, at its outlet opening, an inverted conical valve seat 45, which is adapted to be engaged by a poppet valve member 46 to normally close said outlet opening. Said poppet valve member is provided with a resilient seal ring 47 to engage said seat 45. The poppet valve member 46 is yieldably upwardly or outwardly urged to its closed position by a compression spring 48 which, in a simplified form of the coupling member or hydrant A, is supported for thrust by suitable internal supporting means with which the interior of the body or casing 10 is provided.

Preferably, however, the stationary coupling member or hydrant A is provided, additionally, with a primary plunger valve member operative to normally close its intake end. For this purpose, the stationary coupling member or hydrant is provided, within its hollow body or casing 10, intermediate its intake and outlet ends, and concentrically inwardly spaced from the external wall thereof, with a downwardly open plunger valve casing 49 of reduced diameter. This plunger valve casing 49 is supported from the external wall of the body or casing 10 by radial ribs or webs 50, so as to be unitary with said body or casing, thus providing the latter with an intermediate fluid flow passage 51. Adjacent its upper end said plunger valve casing 49 is provided with a transverse top wall 52, from which depends an upwardly open, axially extending, hollow socket 53 of substantial length. The poppet valve member 46 is provided with a dependent hollow stem 54, which is slidably engaged in and supported by said socket 53. Slidably fitted within the upper end of the stem 54 is a plug 55, and the spring 48 of the poppet valve member 46 is mounted within the socket 53 between its closed bottom end and said plug 55.

The lower end of the body or casing 10 of the stationary coupling member or hydrant A is preferably downwardly and inwardly tapered toward its intake opening 56. Slidably supported for axial movements within the casing 49 is a hollow primary plunger valve 57 having a closed bottom end portion 58. This primary plunger valve 57 is yieldably urged to closed relation to the intake opening 56 of the body or casing 10 by compression spring means 59, which is interposed between its bottom end closure 58 and the top wall 52 of the casing 49. The bottom end closure 58 of said primary plunger valve 57 is provided with a resilient seal ring 60 to engage the walls of said intake opening 56, when said plunger valve is moved to closed position relative to said intake opening 56. The bottom end closure 58 is provided with an intake port 61 which communicates with the fluid service line to which the stationary coupling member or hydrant A is connected in use.

Provided in connection with said primary plunger valve 57 is a manually operative control pilot valve means, the same comprising a pilot valve housing 62 which is affixed to the body or casing 10 and to the primary plunger valve casing 49, for communication with the interior chamber 63 of the latter, through an intake passage 64. Communicating with this intake passage 64 is a discharge port 65, which, in turn, communicates with a discharge passage 66 formed in a bridging portion 67 which is unitary with the body or casing 10, and which discharges into the fluid flow passage 51 of said body or casing above the top wall 52 of the primary plunger valve casing 49. Cooperative with the intake passage 64 of the pilot valve housing 62 is a pilot valve 68. This pilot valve 68 is carried by a stem 69 which is slidably mounted in the housing 62, and which terminates, at its outer end, in a member 70 that is rotatable in the outer end portion of the housing 62. Said member 70 is provided with a radial pin or stud 71 which engages a cam slot 72 formed in the outer end portion of the housing 62. At its outer end, said member 70 is provided with manipulatable lever or handle means 73 by which the member can be rotated. Rotation of said member 70 in one direction moves the pilot valve 68 to closed position (see FIG. 1), and in the other direction to open position (see FIG. 2).

Intermediate the poppet valve 46 and the plug 55 of its stem is a bleed chamber 74 which communicates with the fluid flow passage 51 of the hydrant A through a passage 75 with which the poppet valve 46 is provided. The poppet valve 46 also has a discharge orifice 76 leading outwardly from the bleed chamber 74. This orifice 76 is normally closed by a depressible valve 77 with which the poppet valve 46 is provided (see FIG. 1) and which is normally urged to such closed position by the spring 48 and plug 55. This valve 77 is adapted to be opened on contact of the valve plunger of the coupling member B with said poppet valve 46, when said coupling member B is coupled to the stationary coupling member or hydrant A (see FIG. 2).

To join the coupling members A and B in operative connected relation, the rotatable coupling member B is opposed to and aligned with the stationary coupling member or hydrant A for movement axially toward the latter, projections or rollers 17 of the former being aligned with the notches 12 of the coupling flange 11 of the latter. When the coupling members are brought together, the skirt portion 15 of coupling member B telescopes over the coupling flange 11 of coupling member A, thus passing the projections or rollers 17 through said notches 12 and beneath said coupling flange 11. As this occurs, the key lug 29 of the sun or ring gear carrier member 27 enters a notch 12 of the coupling flange 11, whereby the sun or ring gear 28 is interlocked with the stationary coupling member or hydrant A against rotative movements relative thereto.

The coupling member B can now be rotated about the vertical axes of said coupling members A and B; the scope of such rotation preferably approximating 180°. By such rotative movement of coupling member B, its projections or rollers 17 are carried beneath the coupling flange 11 of coupling member or hydrant A, thereby interlocking the coupling members together in operative connected relation (see FIG. 2). As the coupling members are thus connected, the plunger valve of the rotatable coupling member B is aligned with and opposed to the poppet valve 46 of the stationary coupling member or hydrant A.

The coupling rotation of the coupling member B operates the planetary gear transmissions thereof, causing their spur gears 36 to move around the stationary sun or ring gear 28, thus imparting rotative movement to the shafts 37 and bevel gears 39, and thereby in turn, driving the bevel gears 40, one in one direction, e.g. clockwise, and the other in the opposite direction, e.g. counterclockwise. The driven bevel gears 40, in turn, rotate through their shafts 35, the respective crank discs 34. The crank pins 41 slide pieces 42 of said discs engage in the respective transverse external channels or slotways 43 of the upper section 20 of valve plunger of the coupling member B.

Figure 5:
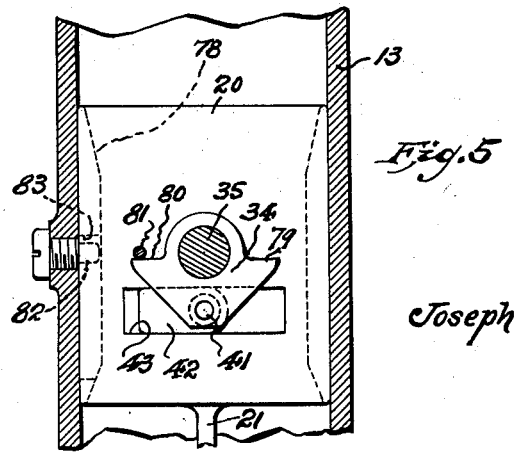
FIG. 5 is also a fragmentary vertical longitudinal sectional view, taken on line 5—5 in FIG. 2, but drawn on a somewhat enlarged scale.
Figure 3:
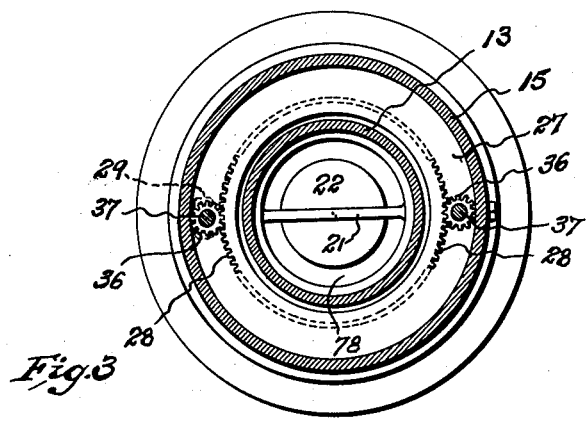
FIG. 3 is a horizontal sectional view, taken on line 3—3 in FIG. 2.

The driven rotation of the crank discs 34 causes their crank pins 41 and slide pieces 42 to move in downward arcuate paths from normal upswung positions (see FIG. 4) to downswung positions (see FIG. 5). Such downward swing of the crank pins and slide pieces is transmitted to the valve plunger of coupling member B, through the engaged channels or slotways 43, which is not only operative to displace the valve disc 24 from its closed relation to the body or casing 13 of coupling member B, but also thrusts against the poppet valve 46 of the stationary coupling member or hydrant A, whereby to displace said poppet valve from its closed relation to the outlet opening of the coupling member or hydrant A. When this occurs, the fluid flow passage 51 of coupling member or hydrant A is brought into communication with an axial fluid flow passage 78, which extends unimpededly through the interior of the coupling member B (see FIG. 2).

In a preferred form thereof, as shown (see FIGS. 4 and 5), the crank discs 34 are shaped to provide oppositely extending stop shoulders 79 and 80 which cooperate with stop studs 81 respectively fixed in and to project respectively from opposite sides of the body or casing 13 of the rotatable coupling member B into the openings or chambers 33 with which said body or casing is provided. In the normal raised and closed position of the valve plunger of coupling member B, a stop shoulder 79 abuts a stop stud 81, thereby to limit upward movement of the valve plunger (see FIG. 4). In the lowered or opened position of said valve plunger, a stop shoulder 80 abuts a stop stud 81, thereby limiting downward movement of the valve plunger (see FIG. 5). By reason of this, the crank discs are limited against movement of their crank pins beyond dead center in both their upwardly and downwardly swung positions.

Figure 6:
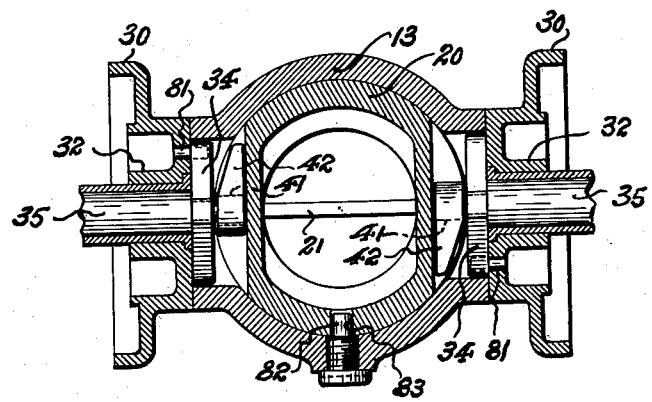
FIG. 6 is a fragmentary horizontal sectional view, taken on line 6—6 in FIG. 4.

Preferably the valve plunger of the coupling member B is keyed to and in connection with the body or casing 13 against rotation relative to the latter. Illustrative means for this purpose (as shown) comprises a key stud 82 which is mounted in the wall of said body or casing 13 to project into an axially parallel slot 83 with which the upper section 20 of valve plunger is provided (see FIGS. 4, 5 and 6).

When diametrically disposed crank discs 34 respectively engage opposite sides of the valve plunger of the coupling member B, a balanced condition is provided, and consequently the keying of the valve plunger to the body or casing could be omitted.

It may be here pointed out that although two diametrically opposite planetary gear systems are shown and described as preferable, there may well be some types of coupling construction wherein but one such system would suffice.

When the valve plunger of the coupling member B is moved downward and into downthrusting opening engagement with the poppet valve 46 of the coupling member of hydrant A, said valve plunger first engages the depressible bleed valve 77 to open the same, thereby establishing communication with the fluid flow passage 51 of the coupling member or hydrant A through the passage 75 and chamber 74 with which the poppet valve 46 of the latter is provided. This permits the fluid to bleed through the discharge orifice 76, and thence to pass, around the loosely fitted headed stud 23 to the interior of the conical head 22 of the valve plunger of coupling member B, being vented therefrom through ports 84 to the fluid flow passage 78 of said coupling member B. By reason of this the resistance of flow fluid to opening of the poppet valve 46 is so diminished, that opening of said poppet valve is thereby facilitated.

After the coupling members A and B are operatively connected together, as above set forth, the manually controlled pilot valve 68 is opened, thereby to evacuate fluid from the casing 49 and the interior of the primary plunger valve 57 of the coupling member or hydrant A, so that said fluid may flow into and through the communicating fluid flow passages 51 and 78 of the connected coupling members A and B. Due to this, the pressure of inflowing fluid through the intake opening 56 of the coupling member or hydrant A will raise and open the primary plunger valve 57 to fluid flow from source. Prior to disconnecting and separating the coupling members A and B, said pilot valve 68 is closed, whereupon fluid from the source can enter the interiors of the casing 49 and primary plunger valve 57 through the port 61 of the latter, thus to substantially balance the fluid pressures in the passage 51 and their interiors. This occurring, the spring 59 can move the primary plunger valve 57 to its normal closed relation to the intake opening 56 of the coupling member or hydrant A, whereupon the coupling members can be disconnected and their valves closed by reverse rotating manipulation of the coupling member B relative to the stationary coupling member of hydrant A.

From the above, it will now be apparent that the coupling members can be coupled together, and their respective valves simultaneously opened, by a single rotative movement of the coupling member B relative to the stationary coupling member or hydrant A. Since the planetary gear transmissions are mounted externally of the body or casing 13 of the coupling member B and of its contained valve plunger, the fluid flow passage of the latter is unimpeded by internal structure, and consequently a free flow area through the connected coupling members is provided, thus miminizing pressure loss.

Having now described our invention, we claim:

1. In a conduit coupling of the type comprising a stationary coupling member and a rotatable coupling member adapted to be opposed end to end, the opposed ends of said coupling members having mutually engageable means to interlock the same together in coupled relation when the rotatable member is rotated relative to the stationary member, the rotatable member having a valve plunger axially slidable therein and normally disposed to close the same against fluid flow therethrough, said stationary member also having axially movable spring biased valve means to normally close the same against fluid flow therethrough; the coupling so characterized, having (1) a ring gear mounted in the end of the rotatable member which opposes the stationary member, means to interlock said ring gear to the stationary member when the coupling members are coupled together, whereby to hold said ring gear stationary relative to rotative movement of the rotatable member, (2) planetary gear transmission means mounted in connection with the rotatable member exteriorly of its valve plunger and adapted to be actuated by said ring gear when the rotatable member is rotated, actuated by said planetary gear transmission means to cause axial opening movement of the valve plunger of the rotatable member, whereby to exert axial thrust against the valve means of the adjoined stationary member to open the latter, and thereby permit fluid flow through the joined coupling members.

2. In a conduit coupling as characterized by and according to claim 1, wherein the means actuated by the planetary gear transmission means to cause opening movement of the valve plunger of the rotatable coupling member comprises a rotatable crank disc having crank pin means, and said valve plunger having an external transverse slotway engaged by said crank pin means.

3. In a conduit coupling as characterized by and according to claim 2, wherein the crank disc is provided with oppositely projecting stop shoulders, and the rotatable coupling member is provided with a fixed stop stud engageable, upon rotation of the crank disc in one direction, by one stop shoulder to limit opening axial movement of the valve plunger and, upon rotation of said crank disc in the opposite direction, is engageable by the other stop shoulder to limit closing axial movement of said valve plunger.

4. In a conduit coupling of the type comprising a stationary coupling member and a rotatable coupling member adapted to be opposed end to end, the opposed ends of said coupling members having mutually engageable means to interlock the same together in coupled relation when the rotatable member is rotated relative to the stationary members, the rotatable member having a valve plunger axially slidable therein and normally disposed to close the same against fluid flow therethrough, said valve plunger having an interior fluid passage therein, said stationary coupling member having a spring biased poppet valve to normally close its discharge end and, a spring biased hollow plunger valve to normally close the inlet end thereof, said stationary coupling member having a chambered casing in which said plunger valve is axially movable, said plunger valve having a port to admit fluid from a source into the casing and plunger valve interior, a manually operable pilot valve to open and close communication between the casing and plunger valve interior and the fluid flow interior of the stationary coupling member, and wherein the poppet valve of said stationary coupling member is provided with bleed passages affording communication between the fluid flow interior of the stationary coupling member and the fluid flow passage of the valve plunger of the rotatable coupling member, and a valve to normally close said bleed passages but adapted to be opened by thrusting contact of the valve plunger of the rotatable coupling member with said poppet valve of the stationary coupling member, the coupling so characterized having (1) a ring gear mounted in the end of the rotatable member which opposes the stationary member, means to interlock said ring gear with the stationary member when the coupling members are coupled together, whereby to hold said ring gear stationary relative to rotative movement of the rotatable member, (2) planetary gear transmission means respectively mounted in diametrically opposite sides of the rotatable coupling member in opposed relation to opposite sides of the valve plunger thereof, said planetary gear transmission means being adapted to be actuated by said ring gear when the rotatable coupling member is rotated, (3) rotatable crank discs having shafts adapted to be driven by said respective planetary gear transmission means, said crank discs having crank pin means, said valve plunger having respective external transverse slotways in its opposite sides and engaged by said crank pins of the respective crank discs, whereby upon rotation of said crank discs to cause axial movements of said valve plunger, opening movement of said valve plunger is operative to exert axial thrust against the poppet valve of the adjoined stationary coupling member to open said poppet valve, and thereby permit fluid flow through the joined coupling members.

5. In a conduit coupling as characterized by and according to claim 4, wherein at least one of the crank discs is provided with oppositely projecting stop shoulders, and the rotatable coupling member is provided with a fixed stop stud engageable, upon rotation of said crank disc in one direction, by one stop shoulder to limit opening axial movement of the valve plunger and, upon rotation of said crank disc in the opposite direction, is engageable by the other stop shoulder to limit closing axial movement of said valve plunger.

References Cited in the file of this patent

UNITED STATES PATENTS

| | | |
|---|---|---|
| 2,319,842 | Benson | May 25, 1943 |
| 2,409,650 | Wiggins | Oct. 22, 1946 |
| 2,567,533 | Thomas | Sept. 11, 1951 |
| 2,568,520 | Smith | Sept. 18, 1951 |
| 2,688,340 | Stehlin | Sept. 7, 1954 |
| 2,729,471 | Fraser | Jan. 3, 1956 |
| 2,943,636 | Reed et al. | July 5, 1960 |
| 2,948,553 | Gill et al. | Aug. 9, 1960 |